(12) United States Patent
Zhuang et al.

(10) Patent No.: US 10,775,810 B2
(45) Date of Patent: Sep. 15, 2020

(54) CONTROL APPARATUS FOR CONTROLLING IOT DEVICES WITH ROTATION OPERATION

(71) Applicant: XIAMEN ECO LIGHTING CO. LTD., Xiamen (CN)

(72) Inventors: Jiaqing Zhuang, Xiamen (CN); Shuwen Zhou, Xiamen (CN); Fengyu Yan, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 77 days.

(21) Appl. No.: 15/860,672

(22) Filed: Jan. 3, 2018

(65) Prior Publication Data

US 2019/0072930 A1 Mar. 7, 2019

(30) Foreign Application Priority Data

Sep. 1, 2017 (CN) .......................... 2017 1 0778815

(51) Int. Cl.
| | |
|---|---|
| *G05D 3/12* | (2006.01) |
| *G05D 23/19* | (2006.01) |
| *G06F 3/0362* | (2013.01) |
| *G06F 3/03* | (2006.01) |
| *G06F 3/0338* | (2013.01) |
| *G05B 19/402* | (2006.01) |
| *H04L 29/08* | (2006.01) |

(52) U.S. Cl.
CPC ........... *G05D 3/125* (2013.01); *G05B 19/402* (2013.01); *G05D 3/127* (2013.01); *G05D 23/1905* (2013.01); *G06F 3/0304* (2013.01); *G06F 3/0338* (2013.01); *G06F 3/0362* (2013.01); *G05B 2219/31156* (2013.01); *H04L 67/12* (2013.01)

(58) Field of Classification Search
CPC .... G06F 3/0304; G06F 3/0338; G06F 3/0362; G05D 23/1905; G05D 3/12; G05D 3/125; G05D 3/127; G05D 3/1454; G05D 3/1463; G05D 3/1481; G05B 19/402; G05B 2219/31156; H04L 67/12
See application file for complete search history.

(56) References Cited

U.S. PATENT DOCUMENTS

| | | | | |
|---|---|---|---|---|
| 5,644,302 | A | * | 7/1997 | Hana ...................... F24F 11/006 236/51 |
| 9,495,023 | B2 | * | 11/2016 | Xu .......................... G06F 3/0362 |
| 10,057,964 | B2 | * | 8/2018 | Raposo ............. H05B 37/0263 |
| 2017/0318924 | A1 | * | 11/2017 | Gharabegian ........ A45B 25/143 |
| 2018/0352920 | A1 | * | 12/2018 | Gharabegian .......... A45B 25/00 |
| 2019/0113985 | A1 | * | 4/2019 | Sawada ..................... G05F 1/67 |

* cited by examiner

*Primary Examiner* — Crystal J Barnes-Bullock
(74) *Attorney, Agent, or Firm* — Chun-Ming Shih; Lanway IPR Services

(57) ABSTRACT

A controller apparatus for controlling IoT devices has a rotation disk, a rotation detection circuit, a control circuit, a wireless circuit, a circuit board and a housing. The rotation disk has a rotating shaft in an inner surface of the rotation disk for generating a rotation operation, where the rotation operation is either a clockwise rotation or a counterclockwise rotation. The rotation detection circuit is used for detecting the rotation operation of the rotating shaft. The control circuit retrieves the rotation operation from the rotation detection circuit, and generates a control instruction according to the rotation operation to the wireless circuit to control a corresponding external device.

17 Claims, 9 Drawing Sheets

CONTROL APPARATUS FOR CONTROLLING IOT DEVICES WITH ROTATION OPERATION

FIELD OF INVENTION

The present disclosure relates to a control apparatus for controlling IoT (Internet of Things) devices, and more particularly relates a control apparatus for controlling IoT devices with rotation operation.

BACKGROUND OF INVENTION

The concept of Internet of Things (IoT) is proposed in 1999, that is, connecting all the items with the Internet through an information testing equipment, such as radio frequency identification, to achieve intelligent identification and management. All the items, whether it is general items, people, or animals, may be equipped with UID (unique identifiers), transferred data to each other through the Internet, so there is no need to rely on people-to-people or people-to-machine interaction. Traditionally, people-to-machine interaction is used to complete a variety of work, while in the future it will be machine-to-machine interaction. The IoT devices may be integrated application with pervasive computing and universal network through the intelligent perception and identification technology, thus it has been known as the third wave of information industry after the computer and the Internet.

Some problems exist for current IoT controllers. First, they are usually too difficult to learn. Second, they are expensive due to high manufacturing cost. The present invention provides innovative solutions to create convenient IoT controllers with low cost.

SUMMARY OF THE INVENTION

According to a first embodiment of the present invention, a controller apparatus for controlling IoT devices has a rotation disk, a rotation detection circuit, a control circuit, a wireless circuit, a circuit board and a housing. The rotation disk has a rotating shaft in an inner surface of the rotation disk for generating a rotation operation, where the rotation operation is either a clockwise rotation or a counterclockwise rotation. The rotation detection circuit is used for detecting the rotation operation of the rotating shaft. The control circuit retrieves the rotation operation from the rotation detection circuit, and generates a control instruction according to the rotation operation to the wireless circuit to control a corresponding external device.

The wireless circuit transmits the control instruction to a corresponding external device to control the corresponding external device. The circuit board is used for mounting the wireless circuit and control circuit. The circuit board may have several parts, instead of one piece. One end of the rotating shaft is connected to the inner surface of the rotation disk and the other end of the rotation shaft is connected to an inner part of the housing. The rotation detection circuit and the circuit board circuit are disposed in the housing.

In this embodiment, one or more external devices may be controlled by one such controller apparatus. The external IoT device may be any electronic equipment, like a computer, a mobile phone, a tablet, lamp, an intelligent door lock, a fire detector, an anti-theft detectors, an audio speaker, an air conditioning machine, an automatic curtain.

The application scenarios may be at home, business places, schools and factories to create an intelligent environment. Intelligent environment takes living space as a platform, by using the integrated wiring technology, network communications technology, security technology, automatic control technology, audio and video technology to integrate the home life-related facilities, to construct efficient residential facilities and family calendar management system, to enhance home safety, convenience, comfort, artistic, and to achieve a living environment with environmental protection and energy saving.

In one embodiment of the present invention, the rotation detection circuit detects a rotation angle generated by the rotating shaft and generates the rotation operation in accordance with the rotation angle. Different rotation angles may correspond to different functions of the external device. Different rotation angles may also correspond to an adjustable volume of the external device. For example, the rotation angle may be a dimmer for controlling illumination level of a bulb that is controlled by the controller apparatus.

The rotation angle may be corresponded to different control instruction during control cycles. For example, the rotation disk is rotated to select a target external device among multiple external devices controlled by the controller apparatus at first stage. A light module may show different light patterns, like colors, to show which external device is to receive the following control instruction. Next, the rotation disk is rotated again and the rotation angle may now correspond to a predetermined adjustment value to a selected external device.

The mapping of the rotation operation to control instructions may be stored as a setting file accessible by the control circuit. Such mapping may be stored in advance during manufacturing and may be changed by a user via an electronic device like a mobile phone. For example, the setting may be configured by a user via a mobile phone. The setting is then sent from the mobile phone to the controller apparatus. The control circuit later changes its behavior according to the updated setting.

In one embodiment of the present invention, the housing may be kept unmoved while a user is rotating the rotation disk. For example, the housing is fixed on a wall.

In one embodiment, the rotation detection circuit may detect a rotation angle of the rotating shaft and generates the rotation operation in accordance with the rotation angle.

In one embodiment, the rotation disk is rotated with respect to the housing to generate the rotation operation.

In one embodiment, a bracket is disposed on a wall, the housing has a corresponding connecting part to be detachably fixed to the bracket. The bracket may be integrated with an original switch on a wall, or a separable device to be mounted on a wall or affixed to the surface of a traditional switch. The bracket may include certain connecting structures and may have further components.

For example, the bracket may have a magnetic component and uses magnetic force to attach the controller apparatus. Furthermore, the bracket may have a protruding block corresponding to a slot of the housing for reliably fixing the relative position between the bracket and the controller apparatus when the bracket and the controller apparatus are connected together. Another way is to place the protruding blocks on the controller apparatus and the slots on the bracket. The two options may be regarded equivalent in way, function and result.

In one embodiment, the bracket may have charging function, and the controller apparatus is charged when the controller apparatus is connected to the bracket. Such charging mechanism may be traditional wire charging. Such charging may also be implemented by placing associated coils for performing wireless charging.

In one embodiment, the rotation disk and the housing may have circular shapes, and the rotation disk and the housing together form a circular disk device with a size to be carried with a hand of a user. For example, such circular disk device may have a diameter less than 15 cm.

In one embodiment, the rotation disk and the housing have different geometric shapes. For example, the housing may be a circular shape while the rotation disk is a polygonal shape.

In one embodiment, the rotation operation may be segmental by corresponding the rotation operation to the rotation disk to a plurality of discrete options instead of continuous value. For example, the rotation operation is not continuous. Instead, the rotation disk may be designed to be rotated in discrete steps, e.g. using related wheel teeth. In such case, a 360 degree rotation may be divided into several parts, e.g. 12 segments each occupying 30 degrees, which means when a user performs a circular rotation, 12 segmental options may be selected or operated.

In one embodiment, wherein the rotation shaft is adjustable to fit a plurality of vertical positions, when one vertical position is chosen by a user, a second control instruction is generated for controlling the corresponding external device. In other words, the rotation disk may not also be rotatable horizontally and may be further adjusted by its vertical position. For example, a user may press the rotation disk to change the vertical position of the rotation disk. Different vertical positions may be corresponded to different control instructions. For example, a user may press the rotation wheel to change among three different vertical levels. Each vertical level may be corresponded to a different external device. Alternatively, each vertical level may be corresponded to a different mode, depending on the predetermined setting of the control circuit.

In one embodiment, a light module may be disposed for showing a different light appearance corresponding to the rotation operation to the rotation disk. For example, the light module may be implemented with one or multiple LED indicators, an LED light showing different colors or patterns, or a display.

In one embodiment, the controller apparatus may also include a motion sensor for converting a user motion applying on the controller apparatus to a third control instruction. For example, in addition to rotate the rotation disk, a user may hold the controller apparatus and move the controller apparatus in a predetermined way to issue a control instruction recognized by the control circuit.

In one embodiment, the controller apparatus may include a pose sensor to detect a current pose of the controller apparatus for being converted to a fourth control instruction. In other words, instead of applying motions on the controller apparatus, a user may change how the controller apparatus is placed, e.g. lying down or standing vertically, to issue control instructions recognized by the control circuit.

In one embodiment, a touch panel may also be disposed on the rotation disk for receiving a touch operation of a user to be converted to a fifth control instruction. In such case, a user may apply touch operations on the rotation disk. Such touch operations may be integrated with the rotation of the rotation disk to determine the control instruction.

In one embodiment, the controller apparatus may also include a light module emitting a predetermined lighting pattern corresponding a status of the controller apparatus. For example, four external devices are to be controlled by the controller apparatus, the light module shows four different lighting patterns so that a user may know which external is to be controlled when the user rotates the rotation disk.

In one embodiment, such lighting pattern may be used to show the status of the controller apparatus, e.g. lack of power, malfunction, failure to connect to the external device or normal function. The control circuit may also receive some messages from the external devices and show the status of the external devices with such lighting pattern.

In one embodiment of the present invention, a bracket may be mounted on a wall, the housing or rotation disk of the controlling device of IoT may be secured to the bracket. The bracket and the controlling device of IoT can be configured with magnetic material to generate a magnetic field, the magnetic field is a vector field. Any position in the magnetic field has a direction and a numerical value. The bracket and the controlling device of IoT are mutually attracted by respective magnetic fields.

In one embodiment of the present invention, the rotation disk and the housing may be have circular shapes, together to form a circular disk device. The rotation disk and the housing may have a shape other than circular shapes, for example, a square, a rectangle, or an ellipse shape. The rotation disk may be a polygonal shape, and the rotating shaft may be distinguished by the polygonal number, taking hexagon as an example, each rotation of sixty degrees, the user can set a corresponding function of the external device.

In one embodiment of the present invention, the rotating shaft in the controlling device of IoT may have one or more sections to be pulled up or pushed down. The control circuit generates the control instruction in accordance with the pull-up section of the rotating shaft, and then transmits the control instruction to the at least one external device, via the wireless circuit. In this embodiment, the outside of the controlling device of IoT may be provided with an illumination device, emitting light of different colors according with the pull-up section of the rotating shaft. The lighting device may be an LED, and the LED is a light-emitting semiconductor electronic component, made of a compound containing gallium, arsenic, phosphorus, nitrogen and the like. LED is characterized by low operating voltage, low current, good anti-impact and anti-vibration, high reliability and long life.

In one embodiment of the present invention, a motion detector may be mounted in the controlling device of IoT, to make the control circuit generate the at least one control instruction according to a state or a movement pattern of the controlling device of IoT. In this embodiment, the motion detector may be a gyroscope, which senses the axle rotation of the controlling device of IoT, and issuing the at least one control instruction when the controlling device of IoT moving along the three-axis movement.

In one embodiment of the present invention, the rotation disk or the housing may be provided with a touch panel, when the controlling device of IoT is stationary, the touch panel displaying time, at that time, the controlling device of IoT can be taken as a clock, and the controlling device of IoT rotating clockwise, counterclockwise or moving to a different position, the touch panel of the controlling device of IoT displaying the function button, thus the user can operate the external device directly, such as lighting, audio and video equipment and air conditioning. The touch panel may be divided into resistive, capacitive, fluctuating (sound wave, infrared) type depend on different principles.

In one embodiment of the present invention, the controlling device of IoT further comprises a light module which emits a different lighting effect according to the at least one control instruction and allows the user to know the current state of the controlling device of IoT. The light module may also emit a different lighting effect depending on the information returned by the external device. For example, when the external device is an electric lamp, the electric lamp in operation inform the user which external device is being controlled by flashing in synchronism with the light module.

In one embodiment of the present invention, the internal of the controlling device of IoT may be provided with a camera or a video recorder, the image may be transmitted back to the cloud acceptor through the wireless circuit after the image is generated by the camera or video recorder, and then the cloud acceptor issuing control instructions according to the image, to determine which external device is going to be controlled by the controlling device of IoT.

DETAILED DESCRIPTION OF THE PREFERRED EMBODIMENT

The preferred embodiments of the present invention are given below, which is intended to be illustrative of the invention and should not to be construed as the limiting of the invention.

Figure 1:
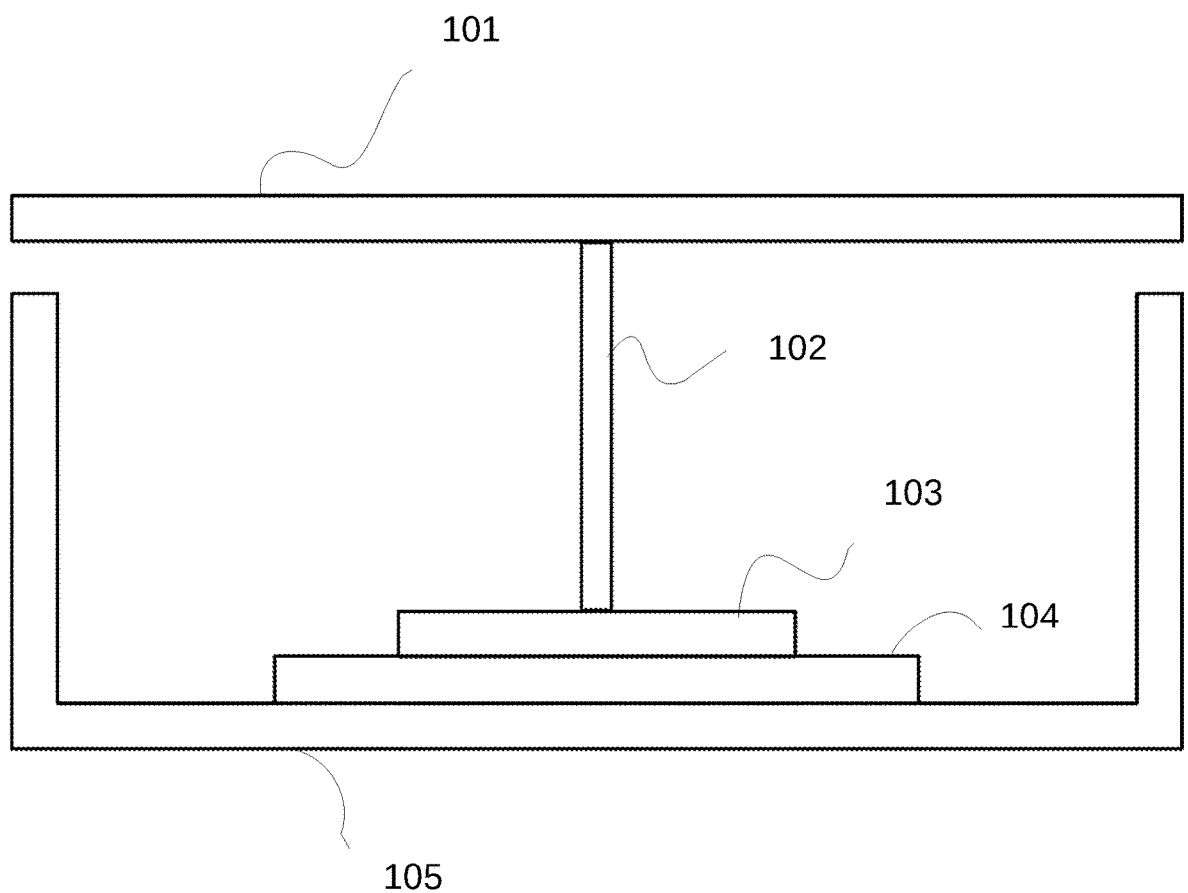
FIG. 1 shows a side view of the controlling device of IoT according to the first embodiment of the present invention.
Figure 2:
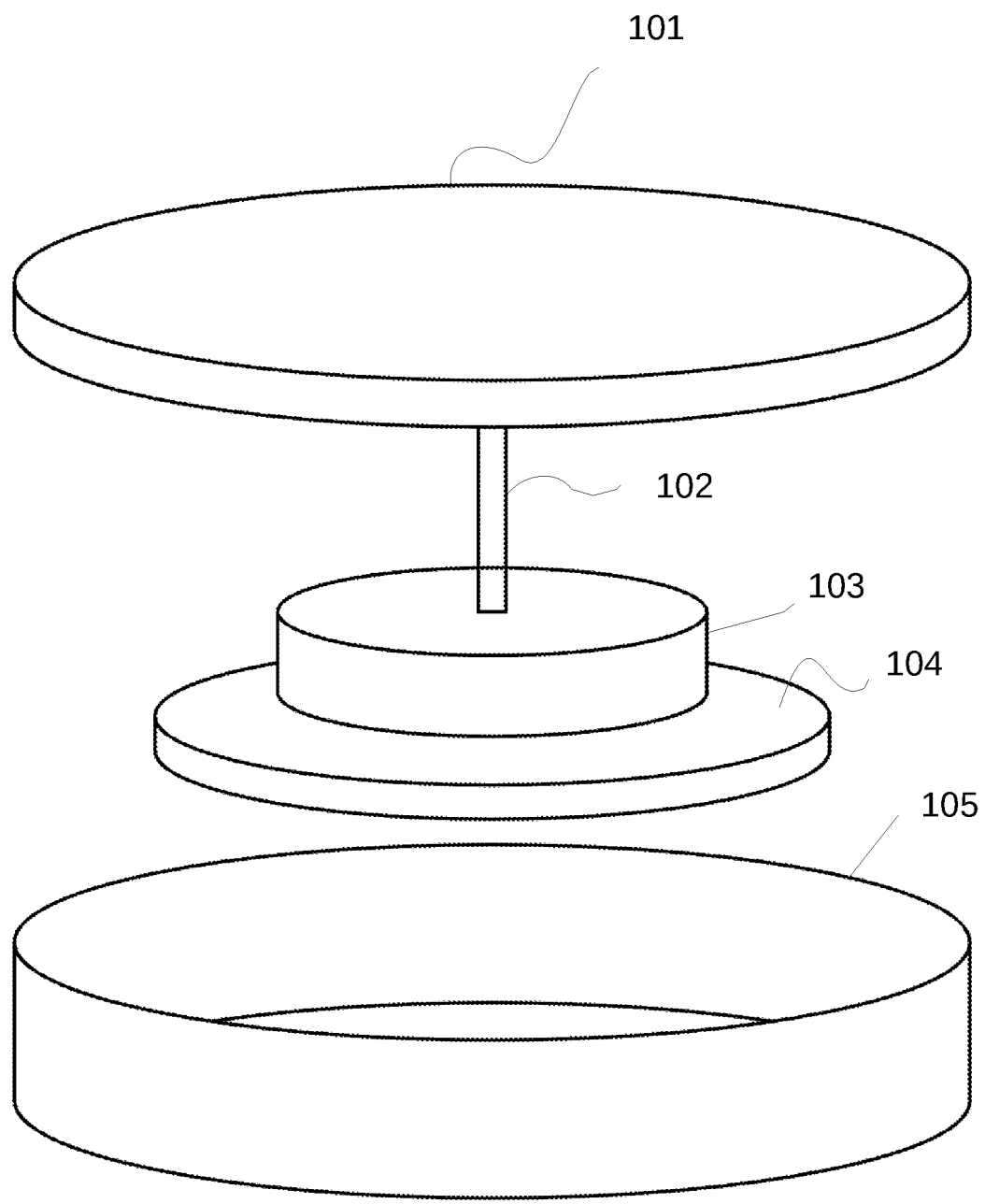
FIG. 2 shows a perspective view of the controlling device of IoT according to the first embodiment of the present invention.

Please refer to FIG. 1 and FIG. 2. FIG. 1 shows a side view of the controlling device of IoT according to the first embodiment of the present invention. FIG. 2 shows a perspective view of FIG. 1. In the first embodiment of the present invention, IoT comprises a rotation disk 101, a rotating shaft 102, a rotation detection circuit 103, a circuit board 104 and a housing 105.

As shown in FIG. 1, the controlling device of IoT is provided with a rotation disk 101, having a flat circular shape, and the rotation disk 101 is provided with a rotating shaft 102, having an elongated rod. And the other end of the rotating shaft 102 is connected to the rotation detection circuit 103, and the rotation detection circuit 103 is mounted on the circuit board 104, and the circuit board 104 is mounted inside the housing 105, the housing 105 is a cylindrical hollow housing.

FIG. 2 shows a perspective view of FIG. 1, as shown in FIG. 2, the rotation disk 101 and the housing 105 combined into a round controlling device of IoT. When the user holds the housing 105 in one hand, the rotation disk 101 is rotated by the other hand, the rotating shaft 102 can generate at least one rotational operation, which may be rotated clockwise or counterclockwise. The at least one rotation operation is transmitted to the rotation detection circuit 103, the rotation detection circuit 103 issues at least one control information, the at least one control information being passed to the corresponded at least one external device by the circuit board 104, to control at least one external device.

Figure 3:
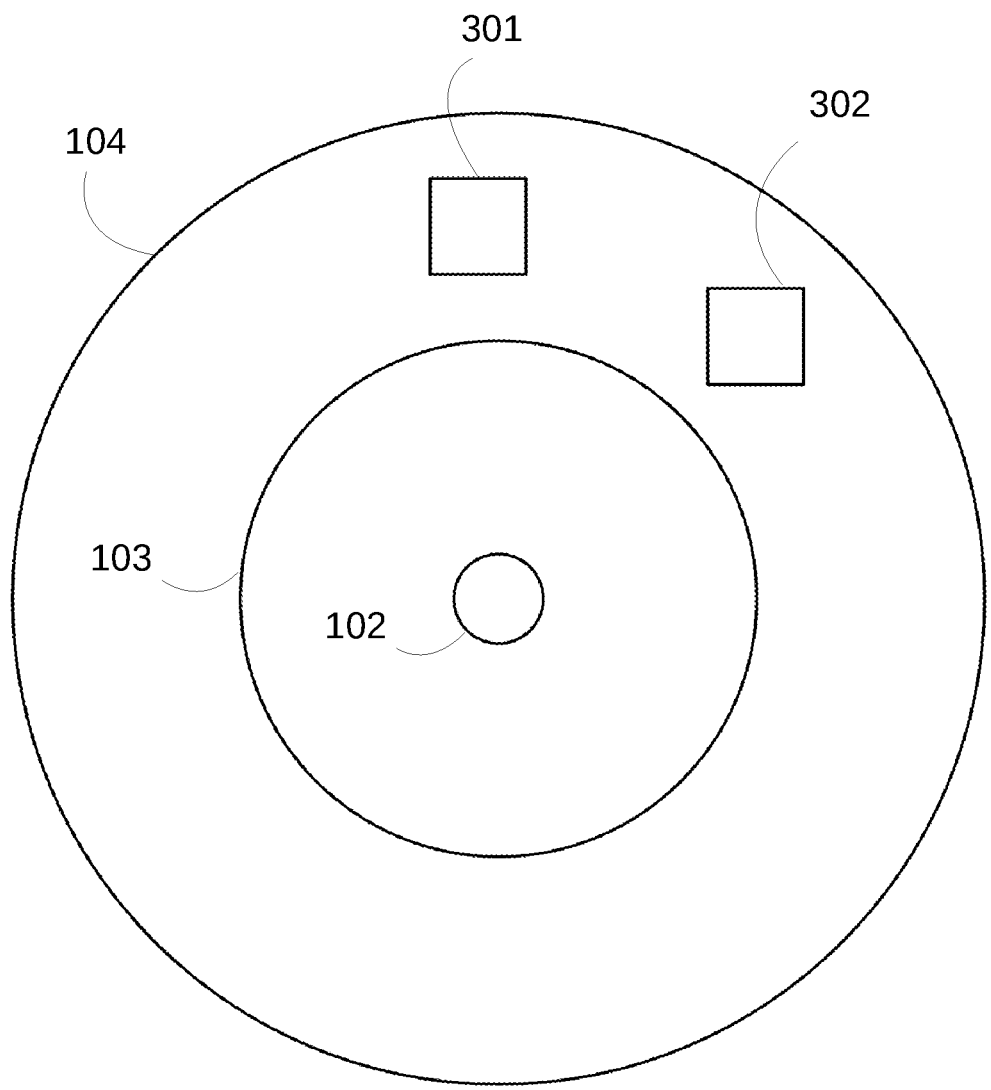
FIG. 3 shows a schematic view of the internal circuit board of the controlling device of IoT according to the first embodiment of the present invention.

FIG. 3 shows a schematic view of the internal circuit board in FIG. 1, as shown in FIG. 3, the circuit board 104 is provided with the control circuit 301, the wireless circuit 302. When the rotating shaft 102 generates at least one rotational operation, the at least one rotation operation is transmitted to the rotation detection circuit 103, the rotation detection circuit 103 emits at least one control information, the at least one control information being passed to the control circuit 301, the control circuit being responsive to the at least one control information to generate at least one control instruction. The at least one control instruction is passed to the wireless circuit 302, the wireless circuit 302 transmits the at least one control instruction to at least one external device one to control at least one external device.

In the first embodiment, the rotation detection circuit 103 detects a rotation angle generated by the rotating shaft 102 and generates the at least one rotation operation in accordance with the rotation angle, the at least one rotation operation issuing the at least one control information, the at least one control information being passed to the control circuit 301, the control circuit 301 being responsive to the at least one control information to generate at least one control instruction. The at least one control instruction is passed to the corresponded at least one external device via the wireless circuit 302. The user can set the function of the external device corresponding to the rotation angle according to the individual habits. The clockwise rotation and the counterclockwise rotation may each represent different functions of the external device, the clockwise rotation and the counterclockwise rotation may also correspond to different external devices.

In the first embodiment, the rotation disk 101 and the housing 105 of the controlling device of IoT are rotatable separately. That is to say, when the rotation disk 101 in the controlling device of IoT rotating, the housing may substantially stationary, producing the at least one rotational operation, the at least one rotational operation issuing the at least one control information. While the housing of the controlling device of IoT rotating, the rotation disk may substantially stationary, producing the at least one rotational operation, the at least one rotational operation issuing the at least one control information.

Figure 4A:
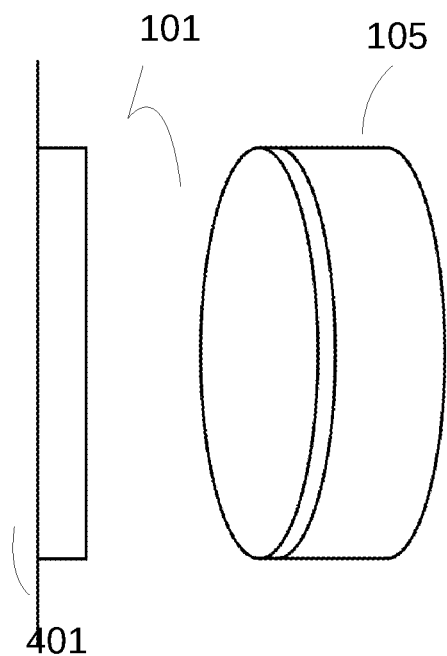
FIG. 4a shows a side view of the controlling device of IoT provided with a bracket according to the second embodiment of the present invention.
Figure 4B:
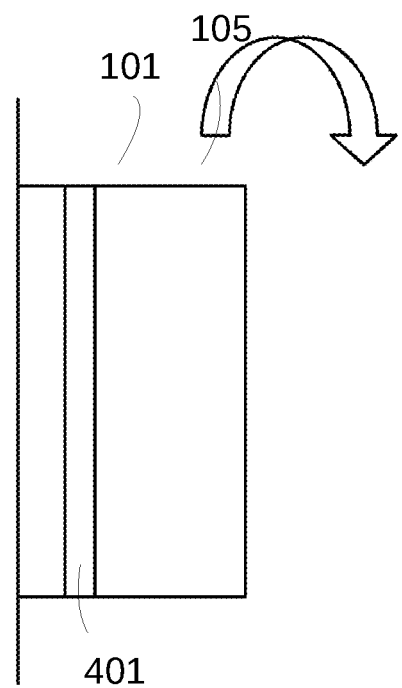
FIG. 4b shows an operation schematic diagram of an of IoT provided with a bracket according to the second embodiment of the present invention.

Please refer to FIG. 4a and FIG. 4b. FIG. 4a shows a side view of the controlling device of IoT provided with a bracket 401 according to the second embodiment of the present invention. FIG. 4b shows an operation schematic diagram of an of IoT provided with a bracket 401 according to the second embodiment of the present invention. In the second embodiment, the use can mount the bracket 401 on a wall, the rotation disk 101 or the housing 105 of the controlling device of IoT may be secured to the bracket 401, to enhance the handling convenience and avoiding the loss of the controlling device of IoT.

In the second embodiment, the bracket 401 and the surface of the controlling device of IoT can be configured with magnetic material to generate a magnetic field, the magnetic field is a vector field. Any position in the magnetic field has a direction and a numerical value. The bracket 401 and the controlling device of IoT are mutually attracted by respective magnetic fields.

The bracket 401 may also be coupled to a socket, the controlling device of IoT may be simultaneously charged when secured to the bracket 401. This socket with charging function can also be designed in wireless charging or magnetic charging. The principle of fast charging is improving output voltage and current of the charger to shorten the charging time of the device. The basic principle of the wireless charging system is charging by electromagnetic induction. For wireless charging, the charger and receiver should be equipped with induction coil. The charger must have a coil that converts the current into a magnetic field, and the coil inside the receiver turns the magnetic field back into current. In this way, the receiver can receive power in the case of no wire, thus charging for the device. Because of the different design purposes, the controlling device of IoT probably need to move, so the controlling device of IoT must be compact and portable. The lifetime of battery in the controlling device of IoT is an important key. The performance of the controlling device of IoT can be effectively enhanced by the design of the bracket 401 engaged with the socket.

Figure 5:
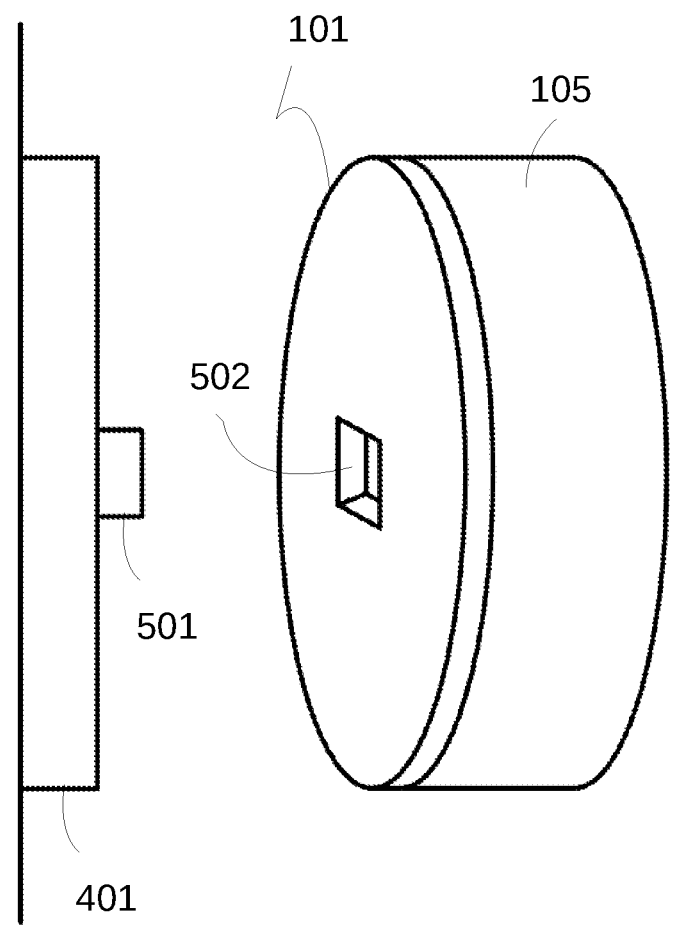
FIG. 5 shows a side view of the controlling device of IoT provided with a projection bracket according to the third embodiment of the present invention.

Please refer to FIG. 5. FIG. 5 shows a side view of the controlling device of IoT provided with a projection bracket according to the third embodiment of the present invention. In the third embodiment, the bracket 401 may be mounted on a wall, and configured with projection 501 and having a corresponding recess 502 disposed outside the controlling device of IoT, the shape of the projection 501 and the recess 502 can be matched, when the controlling device of IoT is placed in the bracket, the projection 501 engaged with the recess 502, so that improving the stability of the controlling device of IoT placed in the bracket 401.

Figure 6:
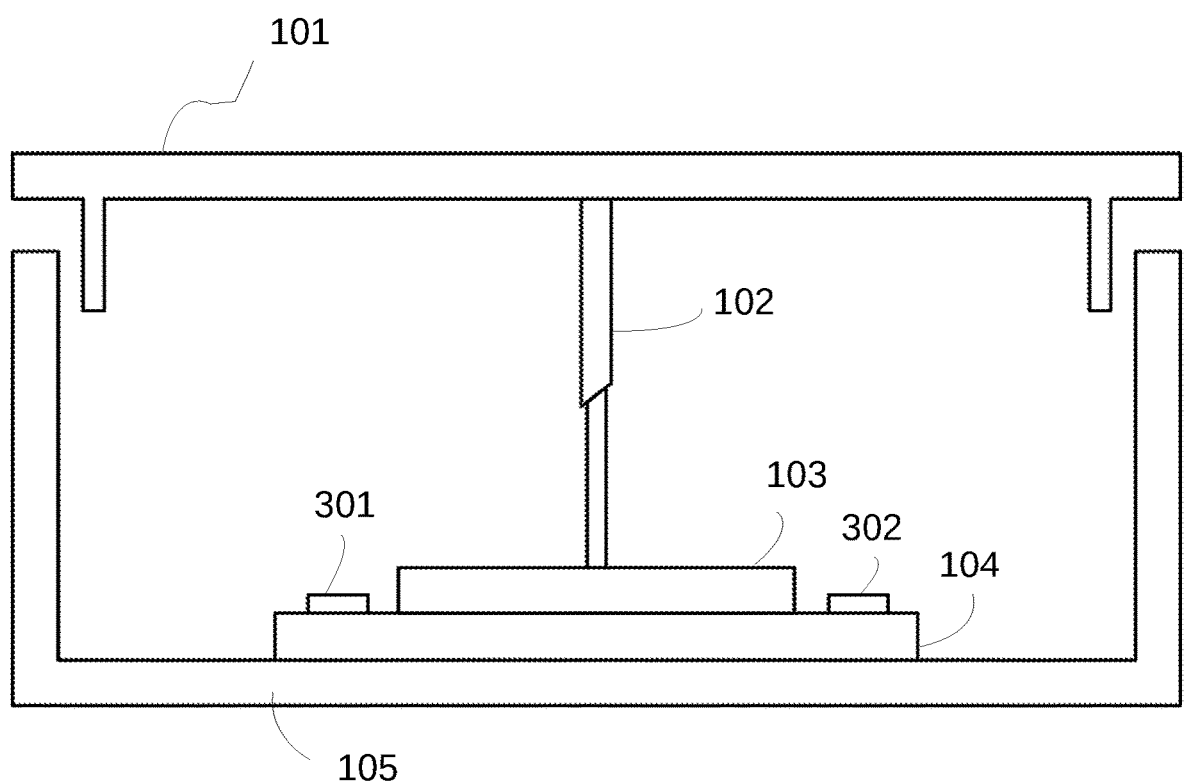
FIG. 6 shows a side view of the controlling device of IoT having segment extension function according to the fourth embodiment of the present invention.

Please refer to FIG. 6. FIG. 6 shows a side view of the controlling device of IoT having segment extension function according to the fourth embodiment of the present invention. In the fourth embodiment, the rotating shaft 102 in the controlling device of IoT may have one or more section can be pulled up, the control circuit 301 generating the at least one control instruction in accordance with the pull-up section of the rotating shaft 102, and then transmitting the at least one control instruction to the at least one external device, via the wireless circuit 302. In the fourth embodiment, the controlling device of IoT may be provided with an external illumination device, emitting light of different colors according with the pull-up section of the rotating shaft 102, to let the user know the current state of the controlling device of IoT more clearly. The lighting device may be an LED, and the LED is a light-emitting semiconductor electronic component, made of a compound containing gallium, arsenic, phosphorus, nitrogen and the like. LED is characterized by low operating voltage, low current, good anti-impact and anti-vibration, high reliability and long life. And under the same lighting effect, comparing to the incandescent lamp, the energy consumption can be reduced by 80%, and comparing to the-energy-saving lamp, the energy consumption can be reduced by 40%, thus the LED is selected as the lighting device, rather than the incandescent lamp, to prevent the lighting device from consuming too much power of the controlling device of IoT, impairing the life of controlling device of IoT.

In other embodiment of the present invention, the rotation disk 101 and the housing 105 may be a circle, to form a round controlling device of IoT. The rotation disk 101 and the housing 105 may have a shape other than a circle, for example, a square, a rectangle, and an ellipse. The rotation disk 101 may be a polygonal shape, and the rotating shaft 102 may be distinguished by the polygonal number, taking hexagon as an example, each rotation of sixty degrees, the user can set a corresponding function of the external device.

Figure 7:
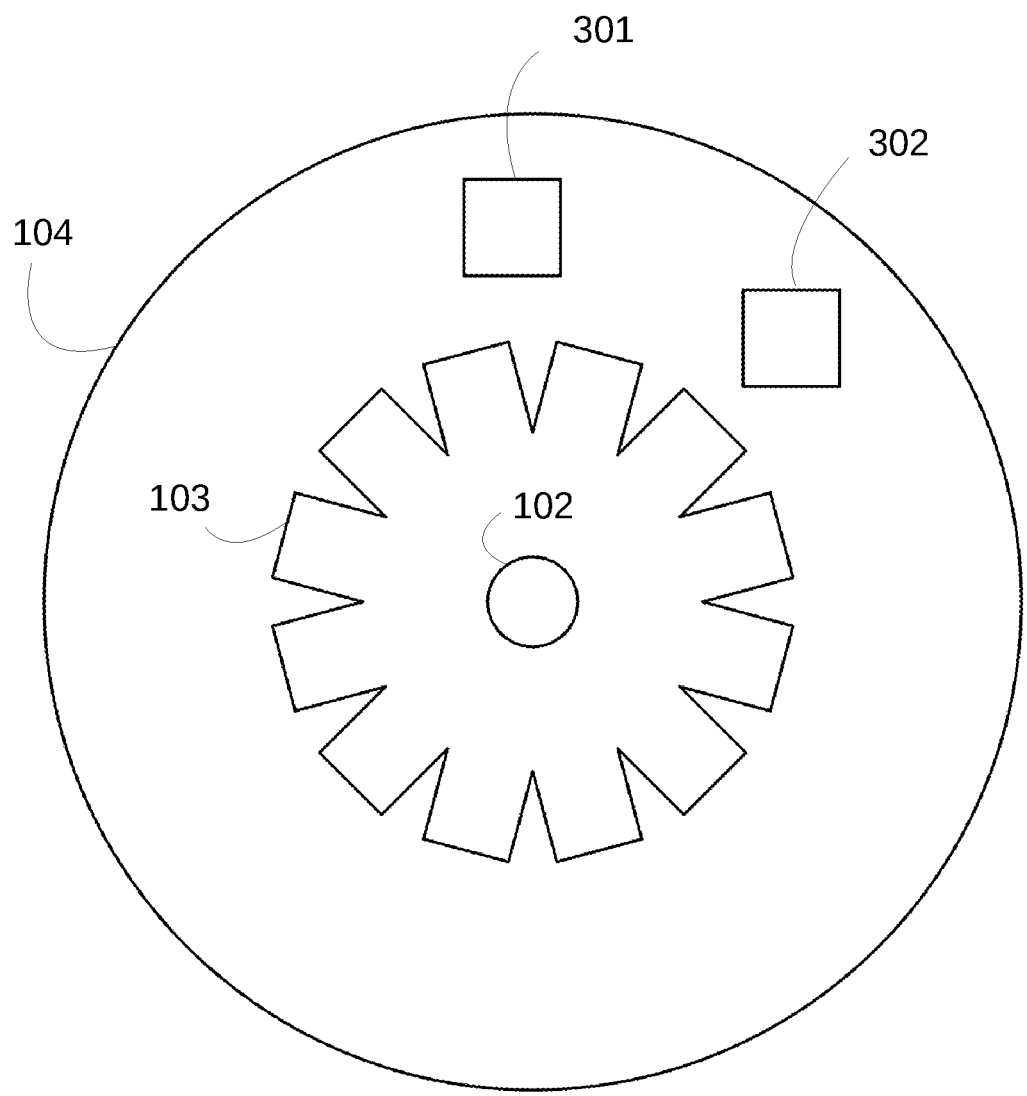
FIG. 7 shows a schematic view of the internal circuit board of the controlling device of IoT according to the fifth embodiment of the present invention.

Please refer to FIG. 7. FIG. 7 shows a schematic view of the internal circuit board 104 of the controlling device of IoT according to the fifth embodiment of the present invention. In the fifth embodiment, the rotation detection circuit 103 of the controlling device of IoT is a polygon, thereby limiting the rotation angle generated by the rotation shaft 102, and each rotation angle may correspond to a different function of the external device, or a different external device. The controlling device of IoT may be configured with a sound module, issuing different sounds according to different rotation angles, thus alerting the user the state of the controlling device of IoT.

Figure 8:
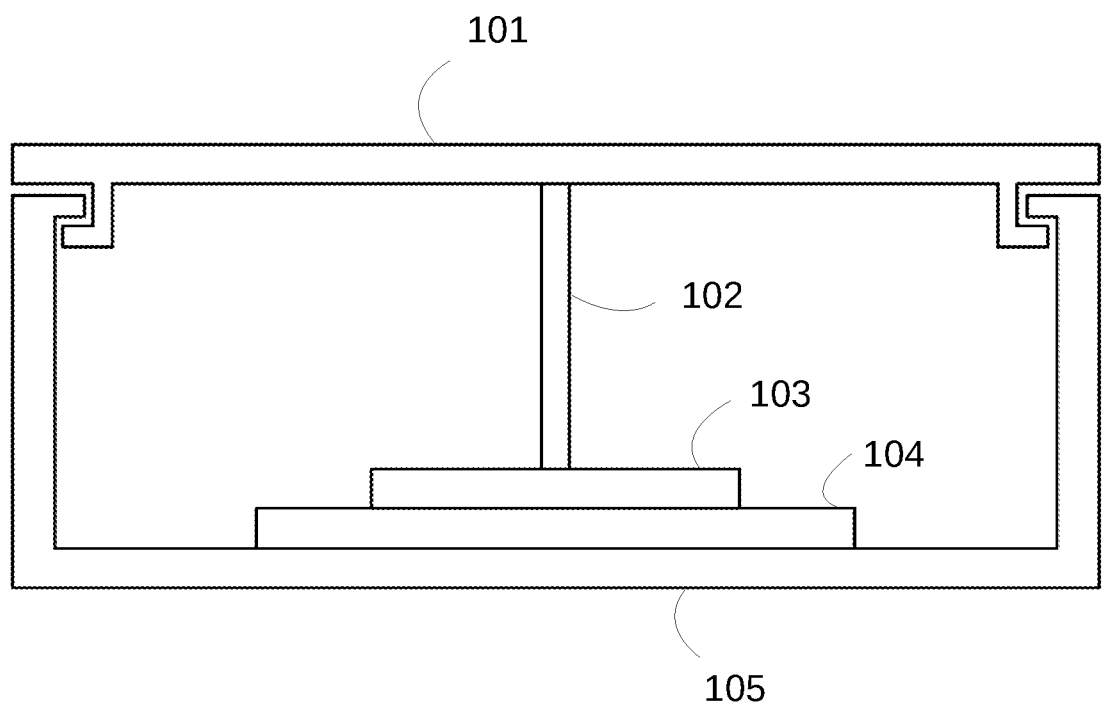
FIG. 8 shows a side view of the controlling device of IoT having a waterproof function according to the sixth embodiment of the present invention.

Please refer to FIG. 8. FIG. 8 shows a side view of the controlling device of IoT having a waterproof function according to the sixth embodiment of the present invention. In the sixth embodiment, the rotation disk 101 of the controlling device of IoT is provided with a waterproof strip adjacent to the housing 105. The housing 105 is provided with a jaw corresponding to the waterproof strip of the rotation disk 101, when the rotation disk 101 is assembled with the housing 105, it can block the water vapor or dust infiltration, thus the controlling device of IoT is waterproof and dustproof, to be applicable to more operating environment, including underwater operation, high humidity working environment and outdoor public facilities, and effectively improve the environmental tolerance of the controlling device of IoT.

Figure 9:
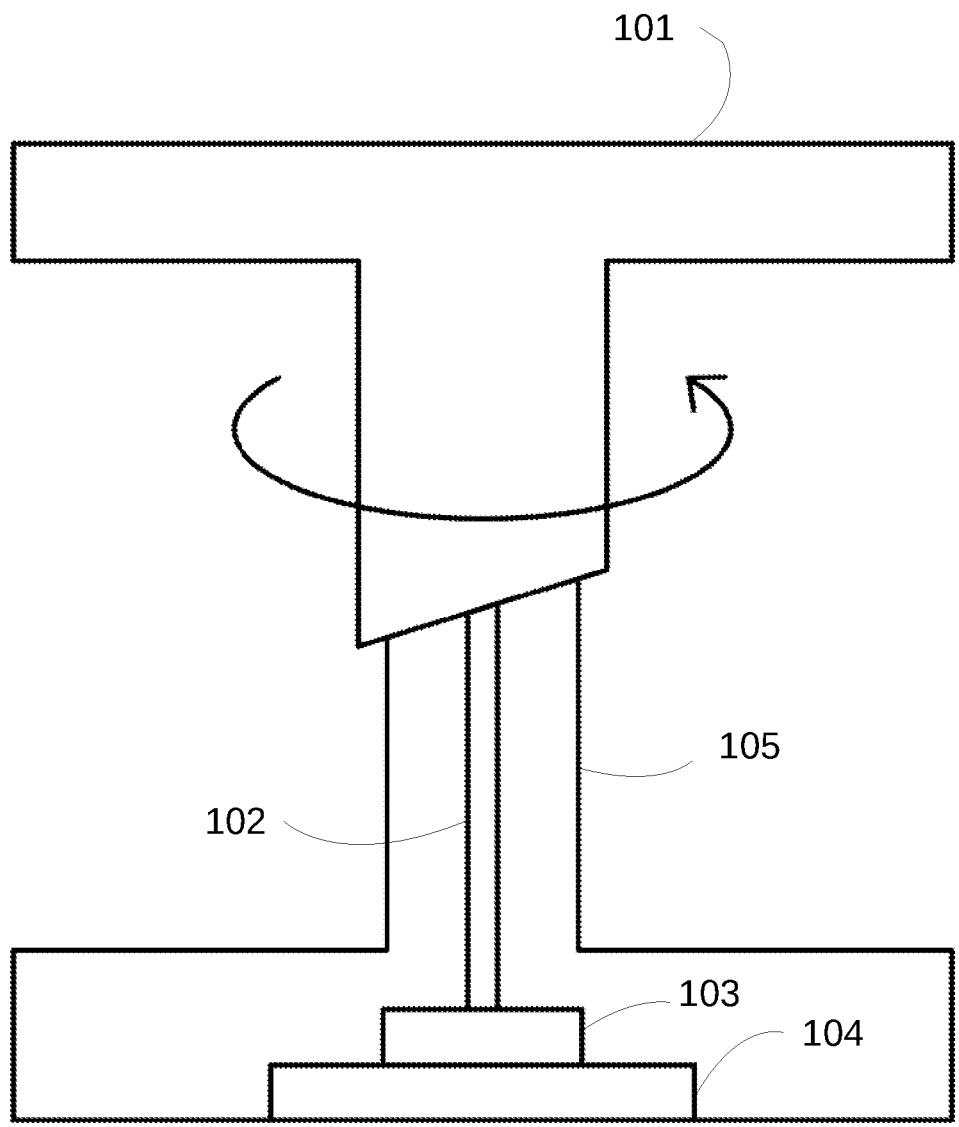
FIG. 9 shows a side view of the controlling device of IoT with other shape according to the seventh embodiment of the present invention.

Please refer to FIG. 9. FIG. 9 shows a side view of the controlling device of IoT with other shape according to the seventh embodiment of the present invention. In the seventh embodiment, the controlling device of IoT is dumbbell-shaped, and provided with the rotation disk 101, and the rotation disk 101 is provided with a rotating shaft 102, having an elongated rod. And the other end of the rotating shaft 102 is connected to the rotation detection circuit 103, and the rotation detection circuit 103 is mounted on the circuit board 104, and the circuit board 104 is mounted inside the housing 105, the housing 105 and the rotation disk 101 is engaged into the dumbbell-shaped controlling device of IoT.

In other embodiment of the present invention, a motion detector may be amounted in the controlling device of IoT, to make the control circuit generate the at least one control instruction according to a state or a movement pattern of the controlling device of IoT. The motion detector may be a gyroscope, the gyroscope is a device for sensing and maintaining the direction, bracketed on the theory of conservation of angular momentum. The gyroscope is mainly composed of a rotor which is located on the axis and rotatable. Once the gyroscope starts to rotate, due to the angular momentum of the rotor, the gyroscope tends to resist the change of direction. The gyroscope senses the axle rotation of the controlling device of IoT, and issuing the at least one control instruction when the controlling device of IoT moving along the three-axis movement.

In other embodiment of the present invention, the rotation disk 101 or the housing 105 may be provided with a touch panel, when the controlling device of IoT is stationary, the touch panel displaying time, at that time, the controlling device of IoT can be taken as a clock, and the controlling device of IoT rotating clockwise, counterclockwise or moving to a different position, the touch panel of the controlling device of IoT displaying the function button, thus the user can operate the external device directly, such as lighting, audio and video equipment and air conditioning. The touch panel may be divided into resistive, including computer, mobile phone, tablet, lamp, intelligent door lock, fire detector, anti-theft detectors, audio, air conditioning, window dimming and audio-visual equipment. The touch panel may be divided into resistive, capacitive, fluctuating (sound wave, infrared) type depend on different principles. The touch panel may be an inductive liquid crystal display or a flat panel device that receives input signals from the contact such as a finger or glue tip. When the contact touch the graphic buttons on the panel, the tactile feedback system on the touch panel can drive the various devices according to a pre-programmed program, the touch panel can replace the mechanical button panel, and by displaying the panel to create a vivid audio and video effect, touch panel is very widely used In other embodiment of the present invention, the controlling device of IoT further comprises a light module which emits a different lighting effect according to the at least one control instruction and allows the user to know the current state of the controlling device of IoT. The light module may also emit a different lighting effect depending on the information returned by the external device. For example, when the external device is an electric lamp, the electric lamp in operation inform the user which external device is being controlled by flashing in synchronism with the light module.

In other embodiment of the present invention, the internal of the controlling device of IoT may be provided with a camera or a video recorder, the image may be transmitted back to the cloud acceptor through the wireless circuit after the image is generated by the camera or video recorder, and then the cloud acceptor issuing control instructions according to the image, to determine which external device is going to be controlled by the controlling device of IoT.

In addition to the above-described embodiments, various modifications may be made, as long as it is within the spirit of the same invention, the various designs that can be made by those skilled in the art should belong to the scope of the present invention.

The invention claimed is:

1. A controller apparatus for controlling IoT devices, comprising:
   a rotation disk having a rotating shaft in an inner surface of the rotation disk for generating a rotation operation, the rotation operation being either a clockwise rotation or a counterclockwise rotation;
   a rotation detection circuit for detecting the rotation operation of the rotating shaft, the rotation shaft is adjustable to fit a plurality of vertical positions;
   a control circuit for retrieving the rotation operation from the rotation detection circuit, and generating a control instruction according to the rotation operation, and when one vertical position is chosen by a user, a second control instruction is generated for controlling a corresponding external device;
   a wireless circuit for transmitting the control instructions to the corresponding external device to control the corresponding external device;
   a circuit board for mounting the wireless circuit and control circuit;
   a motion sensor for converting a user motion applying on the controller apparatus to a third control instruction to control the corresponding external device; and
   a housing, wherein one end of the rotating shaft is connected to the inner surface of the rotation disk and the other end of the rotation shaft is connected to an inner part of the housing, and the rotation detection circuit and a circuit board circuit are disposed in the housing, wherein the rotation disk and the housing have circular shapes, and the rotation disk and the housing together form a circular disk device with a size to be carried with a hand of a user.

2. The controller apparatus of claim 1, wherein the rotation detection circuit detects a rotation angle of the rotating shaft and generates the rotation operation in accordance with the rotation angle.

3. The controller apparatus of claim 1, wherein when the rotation disk is rotated, the housing is fixed on a wall and kept unmoved while generating the rotation operation.

4. The controller apparatus of claim 1, wherein the rotation disk is rotated with respect to the housing to generate the rotation operation.

5. The controller apparatus of claim 1, wherein a bracket is disposed on a wall, the housing has a corresponding connecting part to be detachably fixed to the bracket.

6. The controller apparatus of claim 5, wherein the bracket has magnetic component and uses magnetic force to attach the controller apparatus, the bracket has a protruding block corresponding to a slot of the housing for reliably fixing the relative position between the bracket and the controller apparatus when the bracket and the controller apparatus are connected together.

7. The controller apparatus of claim 5, wherein the bracket has charging function, and the controller apparatus is charged when the controller apparatus is connected to the bracket.

8. The controller apparatus of claim 7, wherein the charging function is wireless charging.

9. The controller apparatus of claim 1, wherein the rotation disk and the housing have different geometric shapes.

10. The controller apparatus of claim 1, wherein the rotation operation is segmental by corresponding the rotation operation to the rotation disk to a plurality of discrete options instead of continuous value.

11. The controller apparatus of 1, further comprising a light module showing a different light appearance corresponding to the rotation operation to the rotation disk.

12. The controller apparatus of 1, wherein the motion sensor comprises a pose sensor to detect a current pose of the controller apparatus for being converted to a fourth control instruction.

13. The controller apparatus of claim 1, further comprising a touch panel on the rotation disk for receiving a touch operation of a user to be converted to a fifth control instruction.

14. The controller apparatus of claim 1, further comprising a light module emitting a predetermined lighting pattern corresponding a status of the controller apparatus.

15. The controller apparatus of claim 1, further comprising a light module emitting a predetermined lighting pattern corresponding a status of the corresponding external device.

16. The controller apparatus of claim 1, further comprising a light module emitting a predetermined lighting pattern indicating which external device among a plurality of external devices controlled by the controller apparatus is currently affected by the rotation operation.

17. The controller apparatus of claim 1, wherein the controller apparatus receives a setting from a mobile phone via the wireless circuit to determine how to convert the rotation operation to the control instruction for controlling the corresponding external device.

* * * * *